United States Patent
Yoshida et al.

(10) Patent No.: US 9,787,069 B2
(45) Date of Patent: Oct. 10, 2017

(54) STRUCTURE FOR MOUNTING RETROFIT PART TO CLADDING MEMBER

(71) Applicant: Yazaki Corporation, Minato-ku, Tokyo (JP)

(72) Inventors: Hiroyuki Yoshida, Kosai (JP); Eiichi Tohyama, Kosai (JP); Tatsuya Oga, Kosai (JP); Shinichi Inao, Kosai (JP); Masaaki Suguro, Kosai (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 65 days.

(21) Appl. No.: 14/560,142

(22) Filed: Dec. 4, 2014

(65) Prior Publication Data
US 2015/0083462 A1   Mar. 26, 2015

Related U.S. Application Data

(63) Continuation of application No. PCT/JP2013/065899, filed on Jun. 3, 2013.

(30) Foreign Application Priority Data

Jun. 4, 2012   (JP) .................................. 2012-126685

(51) Int. Cl.
*H02G 3/04* (2006.01)
*F16B 2/06* (2006.01)
(Continued)

(52) U.S. Cl.
CPC ....... *H02G 3/0406* (2013.01); *B60R 16/0215* (2013.01); *F16B 2/06* (2013.01);
(Continued)

(58) Field of Classification Search
CPC ...... F16B 2/06; H02G 3/0406; B60R 16/0215
See application file for complete search history.

(56) References Cited

U.S. PATENT DOCUMENTS 2,423,627 A    7/1947  Tinnerman
4,970,352 A *  11/1990 Satoh ................... G01R 31/021
                                                174/102 C
(Continued)

FOREIGN PATENT DOCUMENTS

DE   102006043168 A1   3/2008
JP      H10713381 B2    2/1995
(Continued)

OTHER PUBLICATIONS

Oct. 18, 2013—International Search Report & Written Opinion—Intl App PCT/JP2013/065899.
(Continued)

*Primary Examiner* — William H Mayo, III
*Assistant Examiner* — Hiram E Gonzalez
(74) *Attorney, Agent, or Firm* — Banner & Witcoff, Ltd.

(57) ABSTRACT

A structure for mounting a retrofit part to a cladding member may be used to prevent the retrofit part from causing a turn or positional displacement. For example, a clamp structure may include a clamp base and a clamp cover continuous to the clamp base by a hinge. The clamp may further include projections such as spike-shaped portions. The spike-shaped portions are formed and placed on both a mount surface of the clamp base and a mount surface of the clamp cover. The spike-shaped portions may prevent the clamp from causing a turn or positional displacement, and may be each protrusively formed substantially into a pyramid shape with a pointed end. The spike-shaped portions are formed to bite into an exterior surface of a cladding member and that resists external force, such as vibrations, when the clamp is mounted.

7 Claims, 9 Drawing Sheets

(51) Int. Cl.
  *B60R 16/02* (2006.01)
  *F16L 3/10* (2006.01)
  *F16L 3/12* (2006.01)
  *F16L 55/035* (2006.01)

(52) U.S. Cl.
  CPC ........... *F16L 3/1083* (2013.01); *F16L 3/1211* (2013.01); *F16L 55/035* (2013.01)

(56) References Cited

U.S. PATENT DOCUMENTS

| | | | | |
|---|---|---|---|---|
| 5,536,183 | A * | 7/1996 | Brandolf | H01R 4/72 439/470 |
| 5,636,306 | A * | 6/1997 | Mock | G02B 6/4416 385/100 |
| 7,018,221 | B2 * | 3/2006 | Daume | H01R 4/643 439/100 |
| 7,306,476 | B2 * | 12/2007 | Gerlich | H01R 4/2408 439/394 |
| 7,431,593 | B2 * | 10/2008 | Hunter | H01R 4/34 439/98 |
| 7,887,012 | B2 * | 2/2011 | Desai | F16L 3/1075 24/530 |
| 2010/0045106 | A1 | 2/2010 | Oga et al. | |
| 2012/0012716 | A1 | 1/2012 | Lien | |

FOREIGN PATENT DOCUMENTS

| | | |
|---|---|---|
| JP | H0713381 Y | 3/1995 |
| JP | H089540 A | 1/1996 |
| JP | 2000-197244 A | 7/2000 |
| JP | 2001-224118 A | 8/2001 |
| JP | 2002-181242 A | 6/2002 |
| JP | 2010-215010 A | 9/2010 |
| JP | 2011-199966 A | 10/2011 |

OTHER PUBLICATIONS

Jan. 14, 2016—(EP) Office Action—App 13731509.9.
Mar. 29, 2016—(JP) Notification of Reasons for Refusal—App 2012-126685.
May 17, 2016—(JP) Notification of Reasons for Refusal—App 2012-126685.
May 3, 2016—(EP) Office Action—App 13731509.9.

* cited by examiner

STRUCTURE FOR MOUNTING RETROFIT PART TO CLADDING MEMBER

CROSS REFERENCE TO RELATED APPLICATIONS

This application is a continuation of PCT application No. PCT/JP2013/065899, which was filed on Jun. 3, 2013 based on Japanese patent application (patent application 2012-126685) filed on Jun. 4, 2012, whose contents are incorporated herein by reference. Also, all the references cited herein are incorporated as a whole.

BACKGROUND OF THE INVENTION

1. Technical Field

The invention relates to a structure for mounting, to a cladding member that makes up a wire harness, a retrofit part to be retrofitted to the cladding member.

2. Background Art

An electrical connection is established between a battery and an inverter unit in; for instance, a hybrid automobile and a pure electric vehicle, by means of a high voltage wire harness. The wire harness includes a high voltage electric cable that is to serve as a high voltage conductive path and a cladding member that accommodates the high voltage electric cable.

In Patent Document JP-A-2010-215010, the cladding member is a metal pipe, and the wire harness structurally including such a cladding member is fastened to a predetermined position on a vehicle body by means of a clamp retrofitted to the cladding member.

SUMMARY

Incidentally, the clamp retrofitted to the cladding member might turn around an axis of the cladding member or cause positional displacement in an axial direction before being fastened to the predetermined position on the vehicle body. If the clamp has caused a turn or positional displacement, a problem which will arise is that the clamp needs to be returned to its original position before being fixed to the vehicle body. Specifically, there is a problem of a potential to deteriorate workability with regard to mounting a related-art clamp (a retrofit part).

The invention has been conceived in light of the circumstance, and a challenge to be met by the invention is to provide a structure that can prevent turning and positional displacement of a retrofit part and therefore a retrofit part can be mounted on a cladding member to a retrofit part without deteriorating workability.

The above described object of the invention can be achieved by the following structure.

(1) A structure for mounting a retrofit part to a cladding member; the cladding member being pipe-shaped and partly constituting a wire harness that includes one or a plurality of conductive paths and the cladding member for covering the conductive paths, and the retrofit part being retrofitted to the cladding member, wherein an uneven portion or spike-shaped portions are provided at one/plural locations or entirety of the mount surfaces of the retrofit part to which the cladding member is to be attached.

According to the invention having the characteristics, the uneven portion or the spike-shaped portions are provided on the retrofit part, and the uneven portion or the spike-shaped portions are caused to act as portions that prevent the retrofit part from causing a turn or positional displacement.

(2) The structure for mounting a retrofit part to a cladding member according to the above (1), wherein a bitable member that enables the uneven portion or the spike-shaped portions to take bites or a frictional force enhancing member is secured to an exterior surface of the cladding member.

According to the invention having the characteristics, the bitable member or the frictional force enhancing member is provided on the exterior surface of the cladding member, and the bitable member or the frictional force enhancing member is brought into correspondence with the uneven portion or the spike-shaped portions of the retrofit part. Meanwhile, the invention shall not deny that the uneven portion or the spike-shaped portions are caused to directly act on an exterior surface of the cladding member.

(3) The structure for mounting a retrofit part to a cladding member according to the above (2), wherein the bitable member or the frictional force enhancing member corresponds to any one of a tube to be laid over the exterior surface, a resin layer to be provided over the exterior surface, and a coating to be provided over the exterior surface.

According to the invention having the characteristics, any one of the tube, the resin layer, and the coating is secured to the exterior surface of the cladding member, and the one is brought into correspondence with the uneven portion or the spike-shaped portions of the retrofit part.

(4) The structure for mounting a retrofit part to a cladding member according to the above (2), wherein the bitable member or the frictional force enhancing member corresponds to a lower tape winding wound around the exterior surface.

According to the invention having the characteristics, the lower tape winding is secured to the exterior surface of the cladding member, and the lower tape winding is brought into correspondence with the uneven portion or the spike-shaped portions of the retrofit part.

According to the invention defined in the above (1), the surface of the retrofit part to which the cladding member is to be mounted is provided with the uneven portion or the spike-shaped portions. Hence, the uneven portion or the spike-shaped portions act on the cladding member, to thereby yield an advantage of the ability to prevent the retrofit part from causing a turn or positional displacement. This also yields an advantage of the ability to provide a structure for mounting a retrofit part to a cladding member without incurring deterioration of workability.

According to the invention defined in the above (2), the bitable member or the frictional force enhancing member to be brought into correspondence with the uneven portion or the spike-shaped portions of the retrofit part is secured to the exterior surface of the cladding member, so that the uneven portion or the spike-shaped portions can bite or that frictional force can be enhanced. This yields an advantage of the ability to prevent more thoroughly the retrofit part from causing a turn or positional displacement.

According to the invention defined in the above (3), any one of the tube, the resin layer, and the coating is secured to the exterior surface of the cladding member as the bitable member or the frictional force enhancing member, so that the uneven portion or the spike-shaped portions can bite or that frictional force can be enhanced. This yields an advantage of the ability to prevent more thoroughly the retrofit part from causing a turn or positional displacement.

According to the invention defined in the above (4), the lower tape winding is laid, in a secured manner, on the exterior surface of the cladding member as the bitable member or the frictional force enhancing member, so that the uneven portion or the spike-shaped portions can bite or that frictional force can be enhanced. This yields an advantage of the ability to prevent more thoroughly the retrofit part from causing a turn or positional displacement.

BRIEF DESCRIPTION OF THE DRAWINGS

FIGS. 1A and 1B are drawings according to one embodiment of the invention, wherein

FIGS. 4A and 4B are drawings of the clamp shown in FIG. 3, wherein

FIGS. 6A and 6B are drawings of the clamp shown in FIG. 5, wherein

FIGS. 8A and 8B are drawings of the clamp shown in FIG. 7, wherein

DETAILED DESCRIPTION OF EMBODIMENTS

A structure for mounting a retrofit part to a cladding member is one in which an uneven portion or spike-shaped portions are provided at one or plural positions on a surface or over an entire surface of the retrofit part to be mounted on the cladding member. Moreover, a structure for mounting the retrofit part to the cladding member is also one in which a bitable member or a frictional force enhancement member that is compatible with the uneven portion or the spike-shaped portions of the retrofit part is secured to the exterior surface of the cladding member.

Embodiments

Figure 1A:
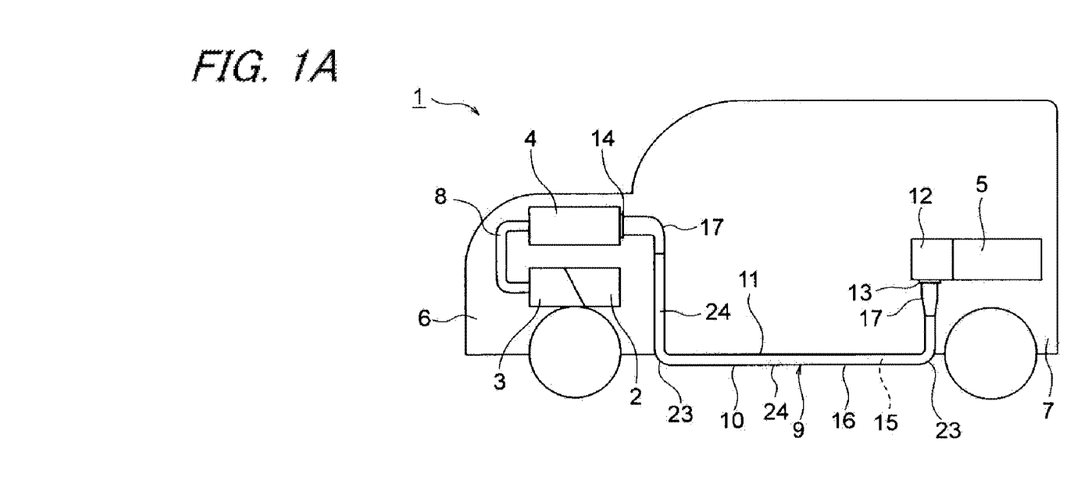
FIG. 1A is a drawing showing a state of a routed wire harness.
Figure 1B:
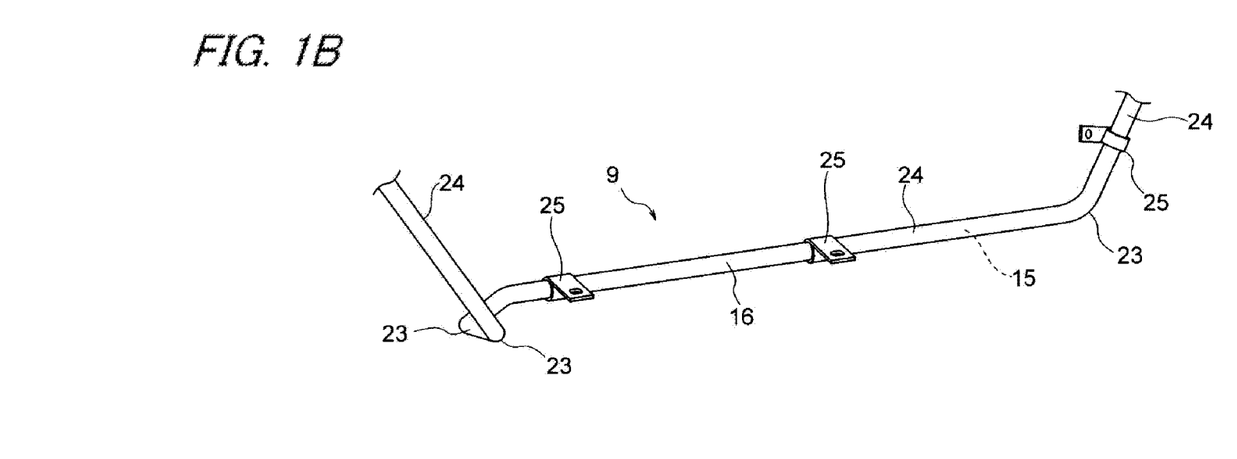
FIG. 1B is a drawing showing a state in which a cladding member is secured to a clamp (a retrofit part)
Figure 2A:
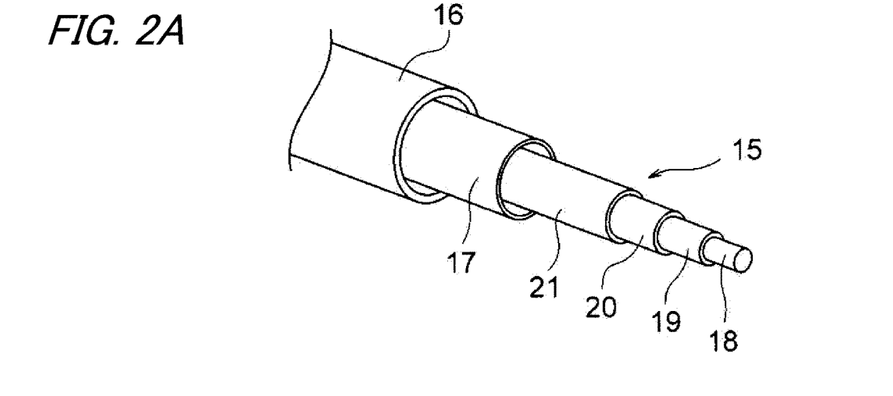
FIGS. 2A to 2C are structural drawings of conductive paths in the wire harness.
Figure 2B:
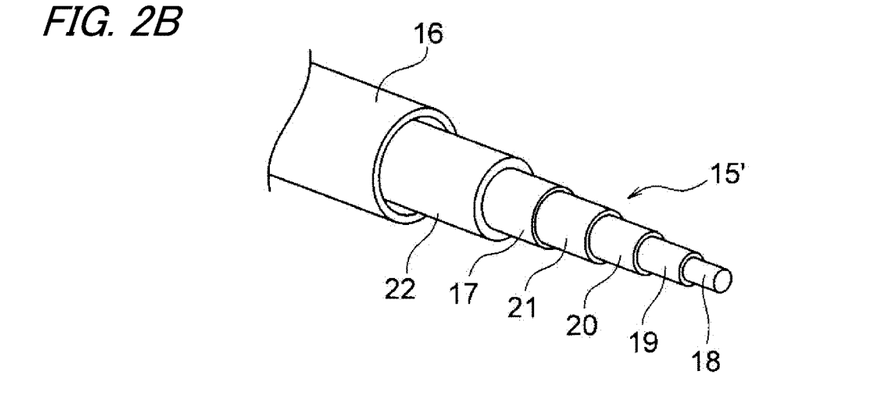
Figure 2C:
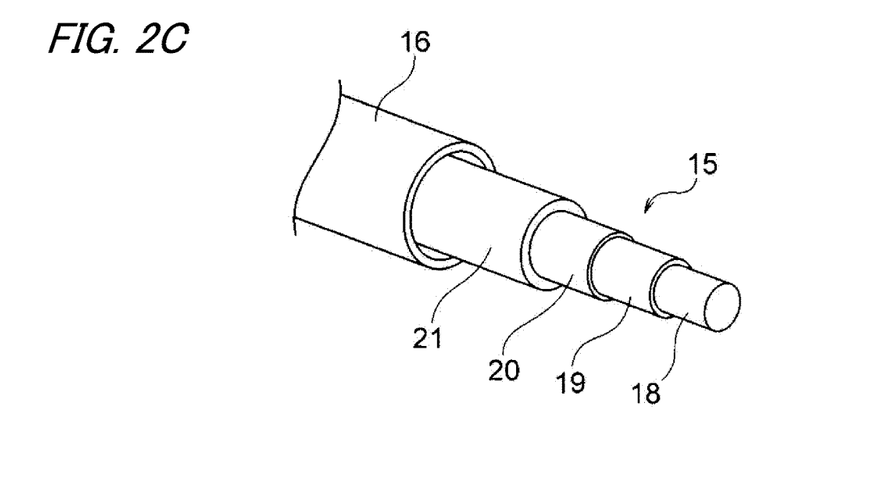
Figure 3:
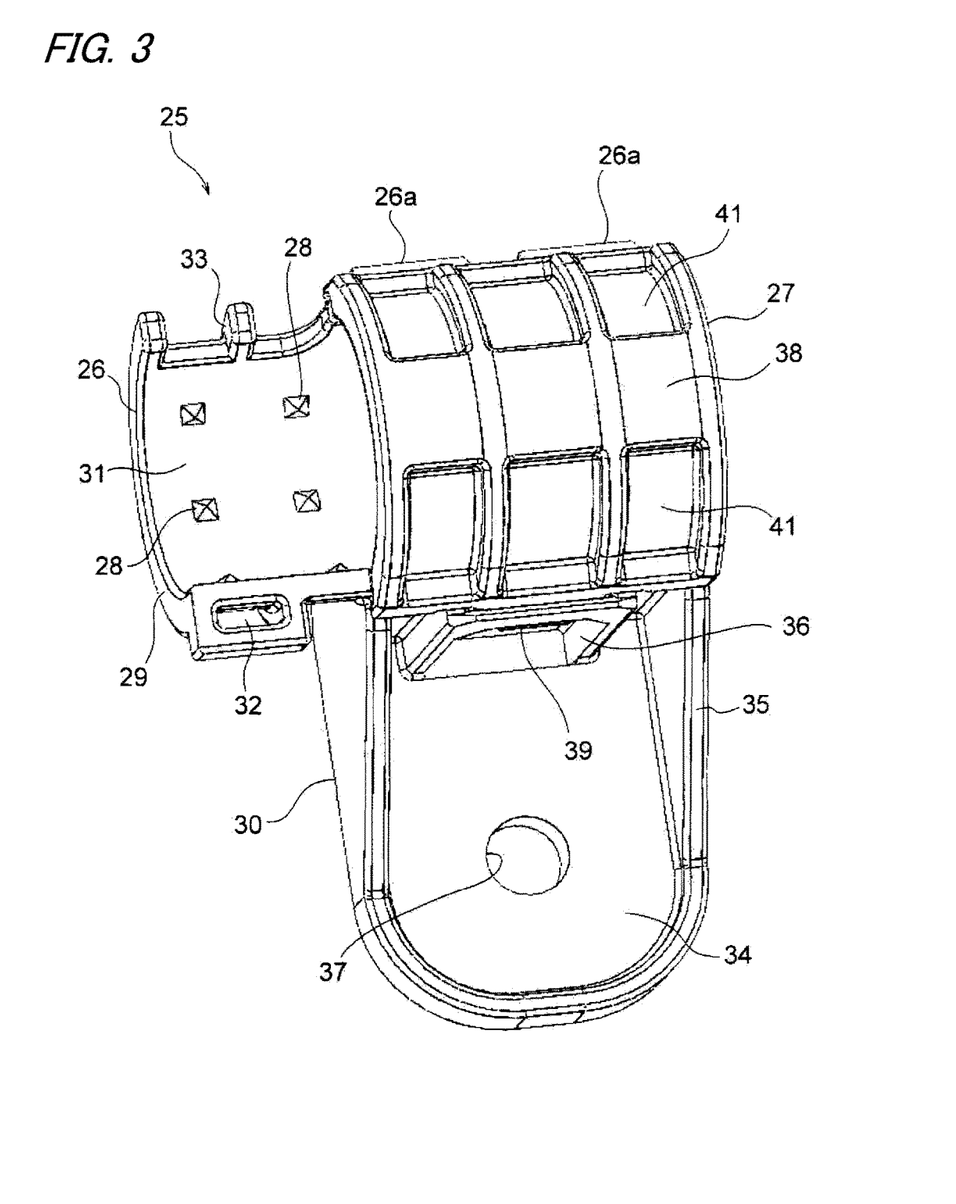
FIG. 3 is a perspective view of the clamp.
Figure 4A:
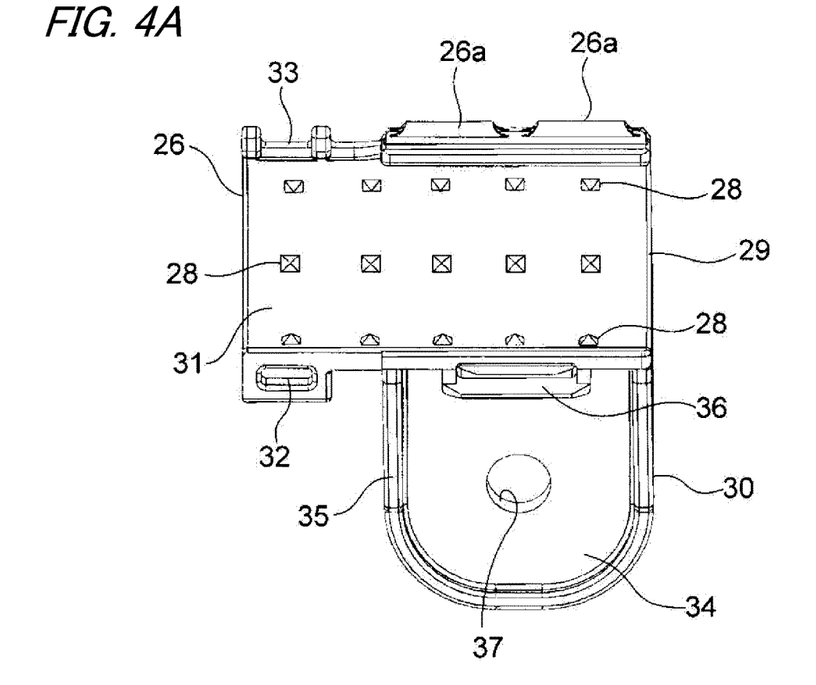
FIG. 4A is a drawing of a clamp base.
Figure 4B:
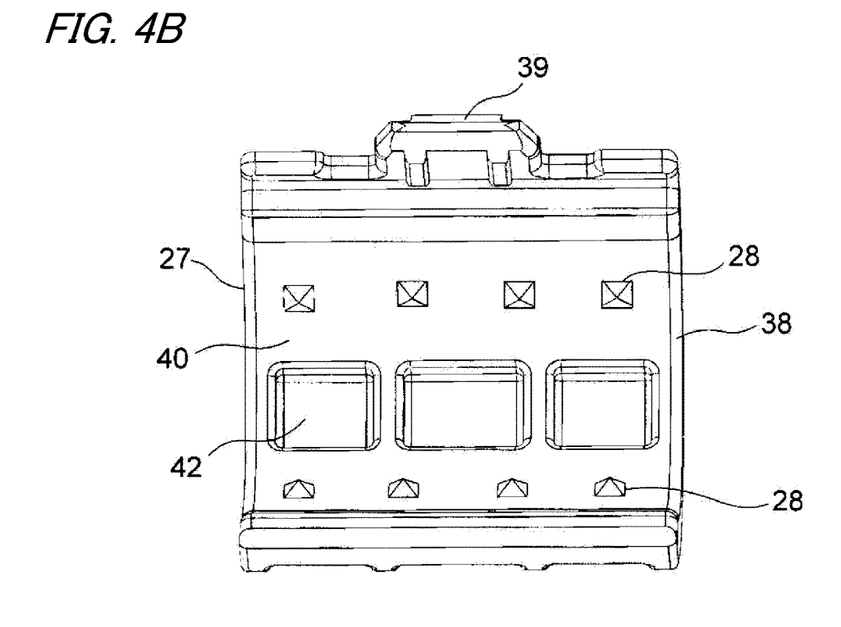
FIG. 4B is a drawing of a clamp cover.
Figure 5:
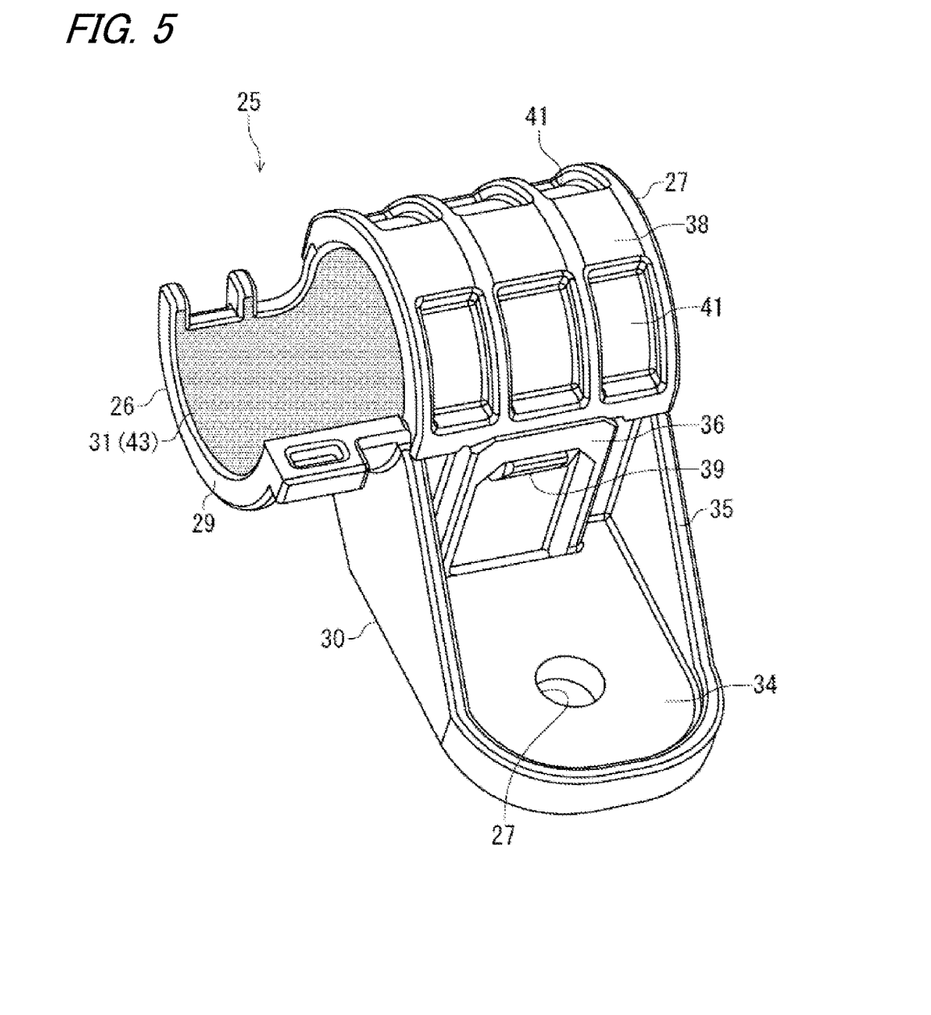
FIG. 5 is a perspective view of a clamp.
Figure 6A:
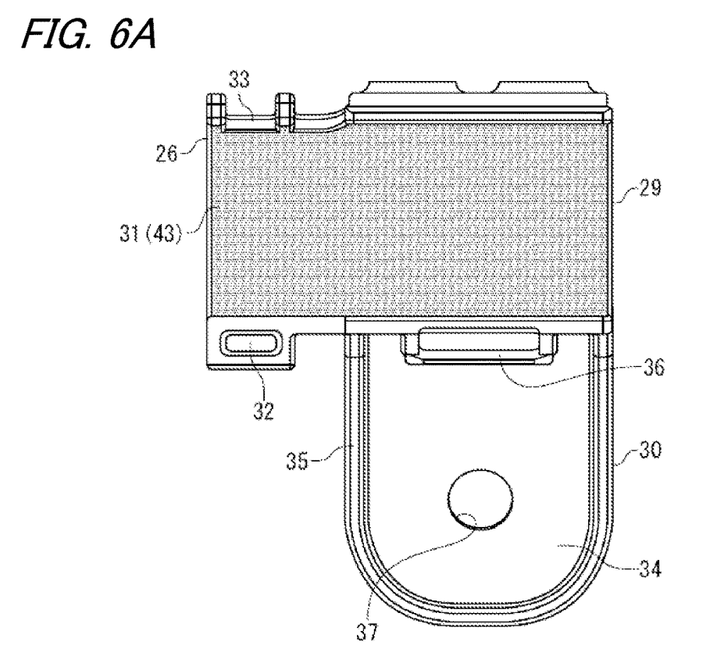
FIG. 6A is a drawing of the clamp base.
Figure 6B:
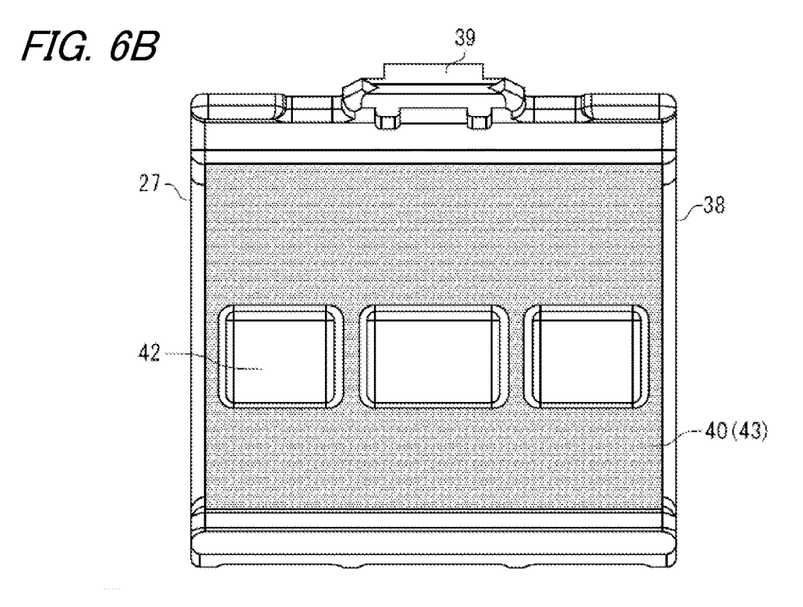
FIG. 6B is a drawing of the clamp cover.
Figure 7:
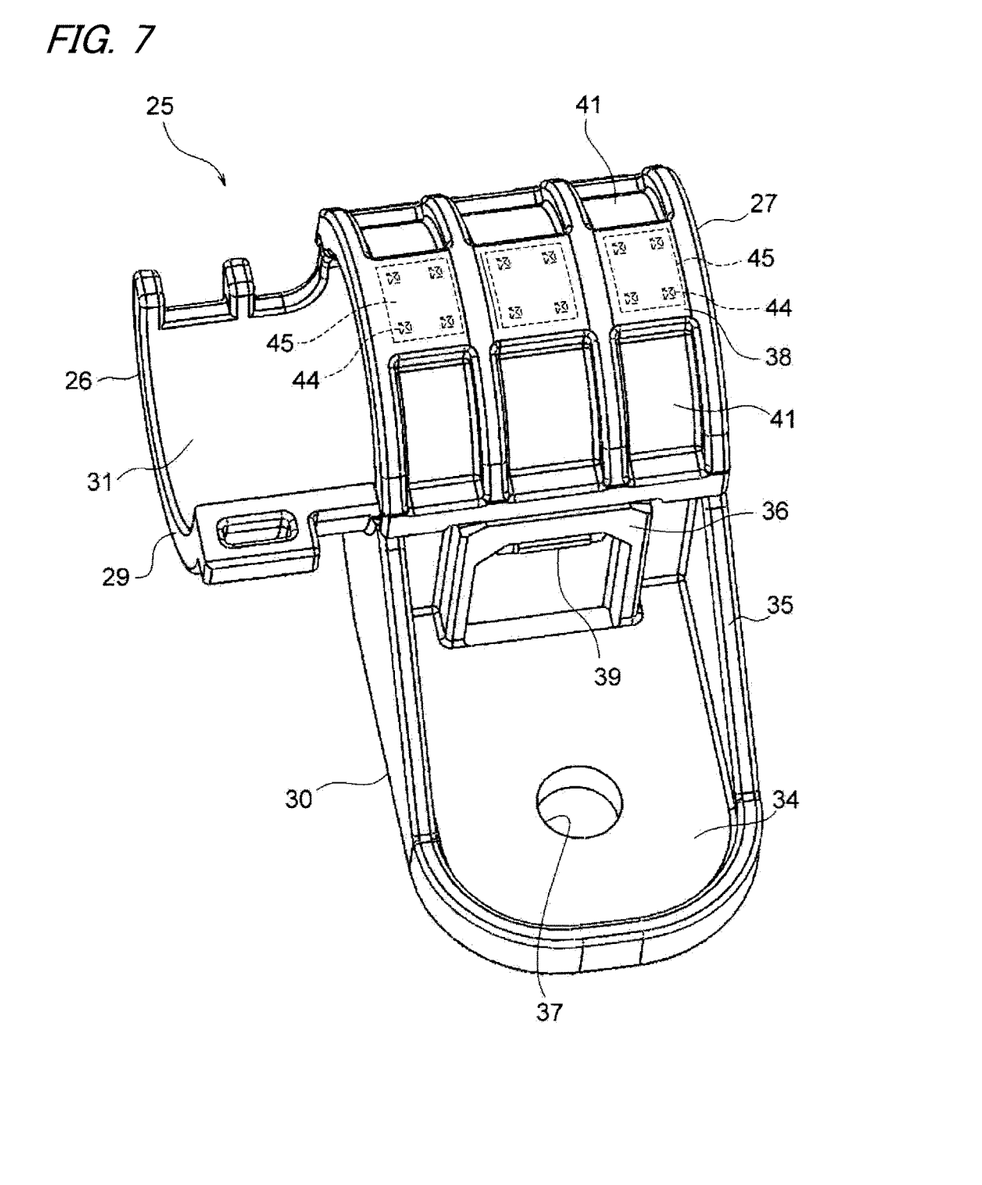
FIG. 7 is a perspective view of a clamp.
Figure 8A:
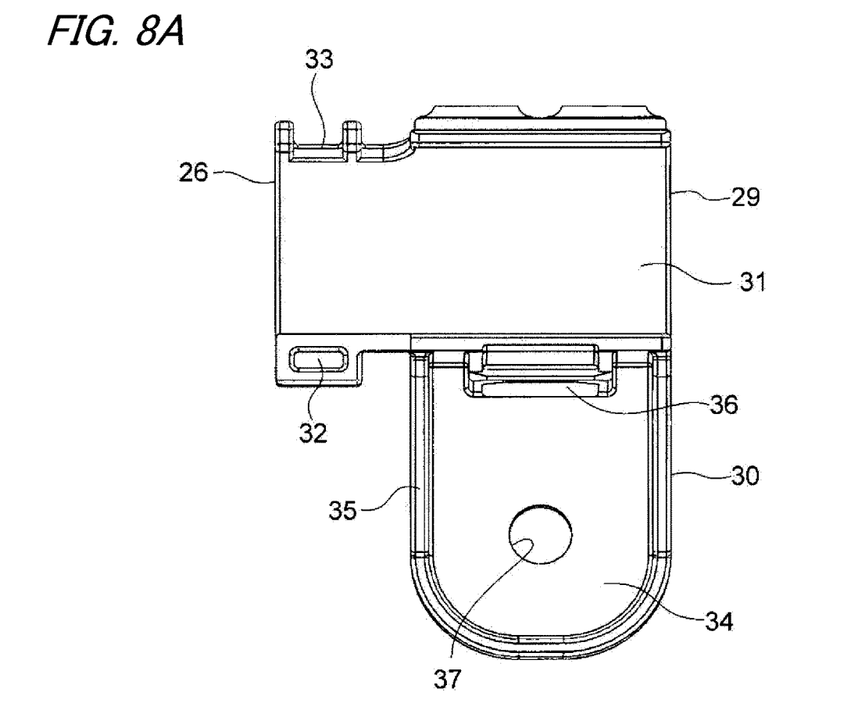
FIG. 8A is a drawing of the clamp base.
Figure 8B:
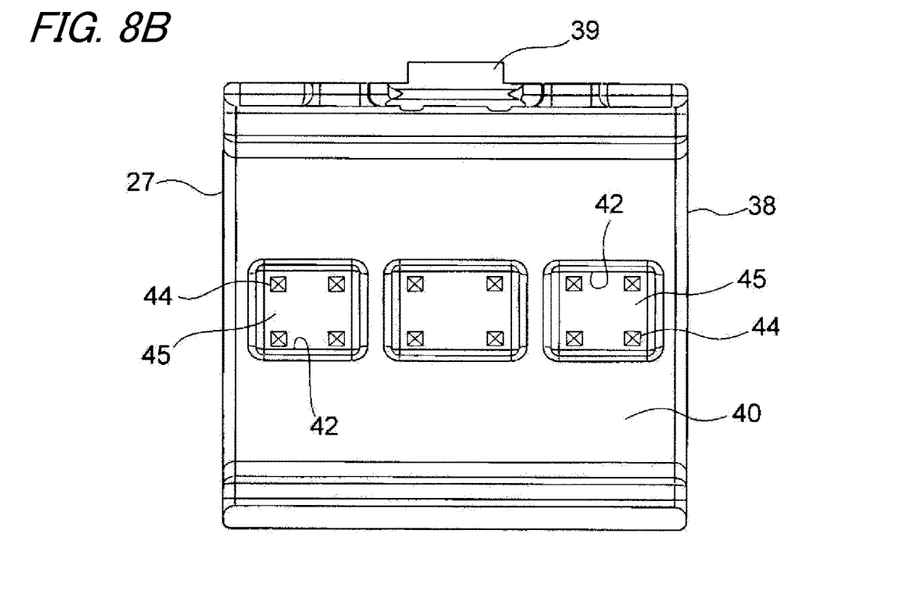
FIG. 8B is a drawing of the clamp cover.

Embodiments are hereunder described by reference to the drawings. FIGS. 1A and 1B are drawings according to one embodiment of the invention, wherein FIG. 1A is a drawing showing a state of a routed wire harness and FIG. 1B is a drawing showing a state in which a cladding member is mounted to a clamp (a retrofit part). FIGS. 2A to 2C are structural diagrams of conductive paths in the wire harness. FIG. 3 and FIGS. 4A and 4B are drawings of a clamp that is to serve as a first embodiment. FIG. 5 and FIGS. 6A and 6B are drawings of a clamp that is to serve as a second embodiment. FIG. 7 and FIGS. 8A and 8B are drawings of a clamp that is to serve as a third embodiment. FIGS. 9A to 9E are perspective views of a cladding member of the wire harness.

In the embodiments, the invention is presumed to be adopted in connection with a wire harness routed in a hybrid automobile (which can also be a pure electric vehicle or a common automobile).

In FIGS. 1A and 1B, reference numeral 1 designates a hybrid automobile. A hybrid automobile 1 is one that is driven by means of a mixture of two powers; namely, an engine 2 and a motor unit 3. Electric power is fed from a battery 5 (a battery pack) to the motor unit 3 by way of an inverter unit 4. The engine 2, the motor unit 3, and the inverter unit 4 are mounted in an engine room 6 where front wheels, and others, are situated in the embodiment. The battery 5 is mounted in an automobile rear portion 7 where rear wheels are situated (the battery can also be mounted in a passenger compartment of the automobile located in a rearward position of the engine room 6).

The motor unit 3 and the inverter unit 4 are connected together by means of a high voltage wire harness 8. The battery 5 and the inverter unit 4 are also connected together by a high voltage wire harness 9. A middle portion 10 of the wire harness 9 is routed on a ground-side of an automobile underfloor 11. The middle portion 10 is also routed substantially parallel to the automobile underfloor 11. The automobile underfloor 11 is a known body and a so-called panel member, and through holes (omitted from the drawings) are formed in predetermined positions. The wire harness 9 is inserted into the through holes.

The wire harness 9 and the battery 5 are connected together by way of a junction block 12 provided in the battery 5. A rear end 13 of the wire harness 9 is electrically connected to the junction block 12 by means of a known method. A front end 14 of the wire harness 9 is electrically connected to the inverter unit 4 by means of a known method.

The motor unit 3 includes, as its configuration, a motor and a generator. Further, the inverter unit 4 includes as its configuration, an inverter and a converter. The motor unit 3 is formed as a motor assembly including a shielded case. Further, the inverter unit 4 is also formed as an inverter assembly including a shielded case. The battery 5 is a Ni—MH-based battery or a Li-ion-based battery and is also presumed to be assembled into a module. Meanwhile, for instance, an accumulator battery; for instance, a capacitor, can also be used. The battery 5 is not particularly limited, so long as the battery can be used in the hybrid automobile 1 or a pure electric vehicle.

A configuration and a structure of the wire harness 9 are first described. The wire harness 9 is a high voltage member for electrically connecting the inverter unit 4 to the battery 5 as mentioned above. The wire harness 9 is built by inclusion of a high voltage coaxial composite conductive path 15 (a conductive path), a cladding member 16, and an electromagnetic shield member 17. The wire harness 9 with such a configuration is fixedly mounted to the automobile underfloor 11, or the like, by way of a clamp 25 (to be described later) that is a retrofit part of the invention.

In the embodiment, when the cladding member 16 does not exhibit a shielding function, the electromagnetic shield member 17 is formed so as to stretch long from the inverter unit 4 to the battery 5. On the contrary, when the cladding member 16 exhibits a shielding function, the electromagnetic shield member 17 is formed so as to be connected to; for instance, both ends of the cladding member 16. Further, when the cladding member 16 does not exhibit a shielding function, the electromagnetic shield member 17 is to be interposed between the high voltage coaxial composite conductive path 15 and the cladding member 16 or to be included in the conductive path. A known braid, an elementary metal foil, or a shield member including a metal foil is adopted as the electromagnetic shield member 17. Another example of the electromagnet shield member 17 includes a conductive area that is realized by providing; for instance, an interior surface of the cladding member 16, with a metal foil or manufacturing the cladding member 16 from a conductive material. The electromagnetic shield member 17 is connected to a shielded case of the inverter unit 4 by way of an unillustrated connector or directly.

In FIG. 2A, the high voltage coaxial composite conductive path 15 is configured such that a plus circuit and a minus circuit are included in one path. Specifically, the high voltage coaxial composite conductive path 15 is configured so as to have two circuit systems. Specifically, the high voltage coaxial composite conductive path 15 includes a first conductive path 18 that is situated at a center of the high voltage coaxial composite conductive path 15 and that assumes a circular cross sectional profile, a first insulator 19 that sheathes a periphery of the first conductive path 18 at a predetermined thickness, a second conductive path 20 provided outside the first insulator 19, and a second insulator 21 that sheathes a periphery of the second conductive path 20 at a predetermined thickness. The tubular electromagnetic shield member 17 is interposed between the high voltage coaxial composite conductive path 15 and the cladding member 16. The electromagnet shield member 17 is made up of a known braid or a metal foil and formed so as to loosely fit around the high voltage coaxial composite conductive path 15 (the electromagnetic shield member 17 can also tightly wrap around an exterior surface of the second insulator 21).

In FIG. 2B, a high voltage coaxial composite conductive path 15' is a modification of the high voltage coaxial composite conductive path 15 shown in FIG. 2A. The high voltage coaxial composite conductive path 15' is made up of the first conductive path 18, the first insulator 19, the second conductive path 20, the second insulator 21, the electromagnetic shield member 17 provided outside the second insulator 21, and a sheath 22 that sheathes a periphery of the electromagnetic shield member 17 at a predetermined thickness.

The cladding member 16 shown in FIGS. 2A and 2B can also be either a metal cladding member or a plastic cladding member. FIG. 2C shows a case where the cladding member 16 is made of metal, wherein the cladding member 16 itself is presumed to serve as a shield member. Further, the electromagnetic shield member 17 is presumed to be connected to the end of such a cladding member 16.

In addition to the high voltage coaxial composite conductive path 15 (15'), a known high voltage electric cable including a conductor and an insulator, a shielded electric cable, a cabtyre cable, and the like, can be mentioned as the conductive path.

In FIGS. 1A and 1B and FIGS. 2A to 2C, the cladding member 16 is a pipe for accommodating and protecting the conductive path, such as the high voltage coaxial composite conductive path 15 (15'), and has a bent pipe portion 23 and an unbent pipe portion 24. The bent pipe portion 23 corresponds to an area to be bent during routing of the wire harness 9, whereas the unbent pipe portion 24 corresponds to an area to be unbent during routing of the wire harness 9. The cladding member 16 is formed from metal or plastic so as to assume a circular cross sectional profile (the cross sectional profile of the cladding member is not limited to a circular shape but can also be an ellipsoidal or elliptical shape). Meanwhile, a modification of the cladding member 16, or the like, will be described later by reference to FIGS. 9A to 9E.

Next, a configuration and a structure of the clamp 25 (a retrofit part) are described. As shown in FIGS. 1A and 1B, the clamp 25 for securing the wire harness 9 to the vehicle body is retrofitted to a predetermined position on the cladding member 16. As will be clear from the following descriptions, the clamp 25 will not cause a turn or positional displacement with respect to the cladding member 16.

In FIG. 3 and FIGS. 4A and 4B, the clamp 25 has a clamp base 26 and a clamp cover 27 that is continuously connected to the clamp base 26 by means of hinges 26a. The clamp 25 has a plurality of spike-shaped portions 28 that make up one of the characteristics of the invention.

In the clamp 25, the clamp base 26, the hinges 26a, and the clamp cover 27 are molded from resin. On the contrary, the spike-shaped portions 28 are formed by embedding a separate hard member; for instance, metal, in a resin. Alternatively, the spike-shaped portions 28 are molded from a resin in the same manner as mentioned above. In the embodiment, the plastic spike-shaped portions are employed.

The clamp base 26 has a pipe mount section 29 and a vehicle body anchor 30 that is continuously connected to the pipe mount section 29. The pipe mount section 29 is an area that corresponds to the cladding member 16 (see FIGS. 1A and 1B), which is a pipe, and is used for mounting the cladding member. The pipe mount section 29 is formed into a substantially semi-cylindrical shape. An interior surface of the pipe mount section 29 serves as a mount surface 31 for the cladding member 16. The mount surface 31 is curved at a curvature radius matching an outer diameter of the cladding member 16.

The pipe mount section 29 is presumed to assume an arbitrary length in an axial direction (an axial direction of the clamp 25). Reference numeral 32 on the pipe mount section 29 designates a band insert section into which an unillustrated binding band is to be inserted, and reference numeral 33 on the pipe mount section 29 designates a band guide for guiding the binding band. In the embodiment, the binding band is presumed to work as an ancillary member for fixedly securing the clamp 25 to the cladding member 16 (When the binding band is not used, the band insert section 32 and the band guide 33 are presumed to be unnecessary. Alternatively, a tape wind area can also be provided in lieu of the band insert section 32 and the band guide 33). Since the spike-shaped portion 28 to be described later is provided in numbers in the invention, superior fixing and securing the clamp 25 to the cladding member 16 will be achieved even if the binding band is not used.

The vehicle body anchor 30 is an area to be anchored to the vehicle body and formed integrally on one side of the pipe mount section 29. The vehicle body anchor 30 includes an anchor body, a reinforcement rib 35, and a female lock 36. The anchor body 34 is formed so as to substantially assume the shape of a tongue flap. An insert hole 37 to be used for securing an unillustrated bolt is formed in such an anchor body 34 in a penetrating manner.

The reinforcement rib 35 is an area that imparts rigidity to the anchor body 34 and that is formed along a rim of the anchor body 34. The reinforcement rib 35 is made up of triangular portions that are continuously connected to one lateral side of the pipe mount section 29. The female lock 36 is an area to be engaged with the clamp cover 27 and formed on one lateral side of or in the vicinity of the pipe mount section 29. A structure of a known lock is presumed to be adopted as a structure of the female lock 36 and a structure of a male lock 39 to be described later, and detailed explanations of the structure are omitted.

The hinges 26a are placed on the other lateral side of the pipe mount section 29 (a lateral side where the vehicle body anchor 30 is not present). The hinges 26a are formed thinner than the other portions. The clamp cover 27, such as that mentioned above, continuously connected to the hinges 26a.

The clamp cover 27 has a cover body 38 and the male lock 39. The cover body 38 is a mount area for the cladding member 16 (see FIGS. 1A and 1B), or a pipe, and is formed into a substantially semi-cylindrical shape. An interior surface of the cover body 38 serves as a mount surface 40 for mounting on the cladding member 16. The mount surface 40 is curved at a curvature radius matching an outer diameter of the cladding member 16. A depression 41 which is to serve as a lightening area is formed in numbers in an exterior surface of the cover body 38. Furthermore, the depression 42 is formed in numbers even in the mount surface 40. In the embodiment, the clamp cover 27 is formed in conformity to a width of the vehicle body anchor 30 (a length of the clamp 25 in its axial direction).

The male lock 39 is an area to be engaged with the clamp base 26 and is formed so as to be placed on one lateral side of the pipe mount section 29 (i.e., a lateral side opposite to that where the hinges 26a are placed). A preferred structure for both the male lock 39 and the female lock 36 is one which clicks when the lock is engaged with the clamp base, thereby making an assembly worker easy realize completion of engagement.

The spike-shaped portions 28 are formed on both the mount surface 31 of the clamp base 26 and the mount surface 40 of the clamp cover 27. The spike-shaped portions 28 are areas that prevent the clamp 25 from causing a turn or positional displacement. In the present embodiment, each of the spike-shaped portions 28 is formed protrusively into an approximate pyramid shape with a pointed end. The spike-shaped portions 28 are formed as areas that bite into an exterior surface of the cladding member 16 (see FIGS. 1A and 1B) and that also withstand external force, such as vibrations, when the cladding member is mounted to the clamp base.

The spike-shaped portions 28 are formed and placed over the entirety of the mount surfaces 31 and 40. Specifically, the spike-shaped portions 28 are placed and formed at predetermined pitches along and around the axis of the clamp 25. In the embodiment, the spike-shaped portions 28 are placed and formed on the mount surface 31 in three rows along the axis of the clamp 25 and in five columns around the axis. The spike-shaped portions 28 are placed and formed on the mount surface 40 in two rows along the axis of the clamp 25 and in four columns around the axis (the layout and number of the spike-shaped portions are mere examples).

Patterns that exhibit the same function as that of the aforementioned spike-shaped portion 28 are now described.

In FIG. 5 and FIGS. 6A and 6B, an uneven portion 43 is formed over both the mount surface 31 of the clamp base 26 and the mount surface 40 of the clamp cover 27. The uneven portion 43 is an area that prevents the clamp 25 from causing a turn or positional displacement and formed, in the embodiment, into an asperity pattern whose entirety is covered with small asperities. For instance, the uneven portion corresponds to sand paper or a knurled pattern. Alternatively, a textured pattern with small projections. The uneven portion 43 is formed particularly as an area that increases frictional force.

In FIG. 7 and FIGS. 8A and 8B, the mount surface 31 of the clamp base 26 and the mount surface 40 of the clamp cover 27 are each provided with a chip 45 which has spike-shaped portions 44. The chips 45 are separate parts with respect to the clamp cover 27 and placed so as to be embedded in the respective depressions 42. When the chips 45 are embedded in the respective depressions 42, the spike-shaped portions 44 jut out from the mount surface 40. As mentioned previously, each of the spike-shaped portions 44 is formed protrusively into an approximate pyramid shape with a pointed end. The spike-shaped portions 44 are formed as areas that bite into an exterior surface of the cladding member 16 (see FIGS. 1A and 1B) and that also withstand external force, such as vibrations, when the cladding member is mounted to the clamp base. The spike-shaped portions 44 are placed at four corners of the individual rectangular chip 45, respectively. The spike-shaped portions 44 are formed four in number on one chip 45. The minimum requirement for the chips 45 is that they should not become detached, and the chips 45 do not always need to be embedded.

Figure 9A:
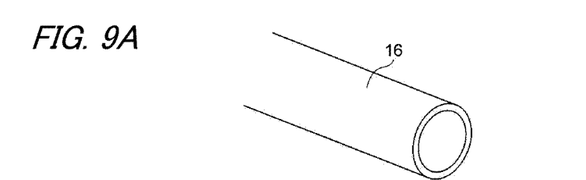
FIGS. 9A to 9E are perspective views of the cladding member in the wire harness.

A modification of the cladding member 16 is subsequently described by reference to FIGS. 9A to 9E. FIG. 9A shows the cladding member 16 that is made up of a metal pipe or a plastic pipe and that is identical with the cladding members shown in FIGS. 1A and 1B and FIGS. 2A to 2C. The invention can be sufficiently materialized by the cladding member 16 shown in FIG. 9A. However, examples shown in FIGS. 9B to 9E are also effective for preventing turning or positional displacement of the clamp 25 (see FIG. 3, FIGS. 4A and 4B, FIG. 5, FIGS. 6A and 6B, FIG. 7, and FIGS. 8A and 8B).

Figure 9B:
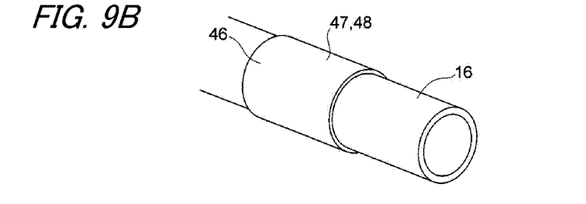

In FIG. 9B, a tube 46 is fitted over the exterior surface of the cladding member 16. A heat shrinkage tube and a rubber tube, which exhibit fixing strength, are mentioned as examples of the tube 46. A material which enables the spike-shaped portions 28 and 44 to take superior bites is adopted for the tube 46, whereby the tube 46 turns into a bitable member 47. The tube 46 also turns into a frictional force enhancing member 48 corresponding to the uneven portions 43, so long as the surface of the tube 46 is made slightly rough or imparted with adhesion.

Figure 9C:
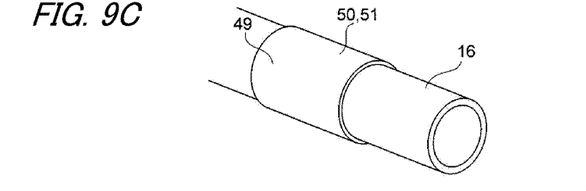

In FIG. 9C, a resin layer 49 is laid over the exterior surface of the cladding member 16. The resin layer 49 is laid in a form of a tube by means of heaping a resin material through; for instance, extrusion molding. As a result of adoption of a material that enables the spike-shaped portions 28 and 44 to take superior bites, the resin layer 49 turns into a bitable member 50. The resin layer 49 also turns into a frictional force enhancing member 51 compatible with the uneven portion 43, so long as the surface of the resin layer 49 is slightly roughened.

Figure 9D:
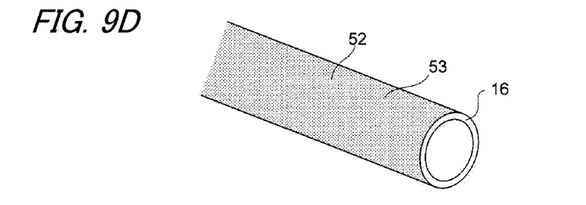

In FIG. 9D, the exterior surface of the cladding member 16 is given a coating 52. Even in the case of the coating 52, the coating 52 turns into a bitable member 53 that enables the spike-shaped portions 28 and 44 to take superior bites.

Figure 9E:
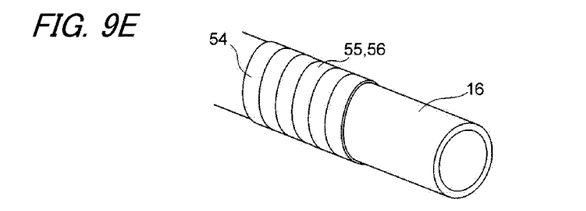

In FIG. 9E, a lower tape winding 54 formed from a coiled tape is laid on the exterior surface of the cladding member 16. The lower tape winding 54 turns into a bitable member 55 that enables the spike-shaped portions 28 and 44 to take superior bites. The lower tape winding 54 also turns into a frictional force enhancing member 56.

As has been described by reference to FIGS. 1A and 1B, FIGS. 2A to 2C, FIG. 3, FIGS. 4A and 4B, FIG. 5, FIGS. 6A and 6B, FIG. 7, FIGS. 8A and 8B, and FIGS. 9A to 9E, a structure for mounting the cladding member 16 to the clamp 25 (the retrofit part) is one that is realized by providing the surfaces 31 and 40 of the clamp 25 to which the cladding member 16 is to be mounted with the uneven portion 43 or the spike-shaped portions 28 and 44. Therefore, the uneven portion 43 or the spike-shaped portions 28 and 44 act on the cladding member 16, thereby yielding the ability to prevent the clamp 25 from causing a turn or positional displacement.

The structure for mounting the clamp 25 to the cladding member 16 (the retrofit part) exhibits an effect of preventing deterioration of workability.

The structure for mounting the cladding member 16 to the clamp 25 described in connection with the embodiment exhibits the following characteristics; namely, (1) a structure for mounting the cladding member 16 to the clamp 25; the cladding member 16 being pipe-shaped and partly constituting the wire harness 9 that includes one or a plurality of conductive paths 15 and the cladding member 16 for covering the conductive paths 15, and the clamp 25 being secured to the wire harness 9 to a predetermined position on the vehicle body, wherein the uneven portion 43 or the spike-shaped portions 28 and 44 are provided at one/plural locations or entirety of the mount surfaces 31 and 40 of the clamp 25 to which the cladding member 16 is to be attached;

(2) the structure for mounting the clamp 25 to the cladding member 16 defined in connection with (1), wherein the bitable members 47, 50, 53, and 55 that enable the uneven portion 43 or the spike-shaped portions 28 and 44 to take bites or the frictional force enhancing members 48, 51, and 56 are secured to the exterior surface of the cladding member 16;

(3) the structure for mounting the clamp 25 to the cladding member 16 defined in connection with (2), wherein the bitable members 47, 50, and 53 or the frictional force enhancing members 48 and 51 correspond to any one of the tube 46 to be laid over the exterior surface, the resin layer 49 to be provided over the exterior surface, and the coating 52 to be provided over the exterior surface; and (4) the structure for mounting the clamp 25 to the cladding member 16 defined in connection with (2), wherein the bitable member 55 or the frictional force enhancing member 56 corresponds to the lower tape winding 54 wound around the exterior surface.

Retrofit parts except the clamp 25 are presumed to include parts called a protector, a clip, a bracket, and the like. The retrofit parts also include a part for additionally providing the cladding member 16 with a linear member; for instance, an electric cable, and a part for linking the cladding member 16 to another member, like peripheral equipment or a panel. The retrofit parts are also presumed to further include positioning parts, or the like. In other words, the retrofit parts are not particularly limited, so long as they can be retrofitted to the cladding member 16.

It is apparent that various modifications can be made in the invention within a scope not deviating from the gist of the invention.

The present invention is useful for providing a structure for mounting a retrofit part to a cladding member that can prevent the retrofit part from causing a turn or positional displacement to thus hinder deterioration of workability.

What is claimed is:

1. A structure for mounting a retrofit part to a cladding member, the cladding member being pipe-shaped and partly constituting a wire harness that includes one or a plurality of conductive paths, the cladding member covering the conductive paths, and the retrofit part being retrofitted to the cladding member, the structure comprising:

a clamp base having a mount surface configured to receive the cladding member;

a clamp cover configured to cover at least a portion of the mount surface of the clamp base, wherein the clamp base and the clamp cover form an opening through which the cladding member is configured to be received in an insertion direction, the clamp cover including a recess in a clamp cover surface facing the cladding member when the clamp cover is in a closed position, wherein the mount surface of the clamp base includes a first plurality of projections provided at locations along the insertion direction, the first plurality of projections being spaced from edges of the mount surface; and a chip comprising a second plurality of projections, the chip configured to be inserted into the recess of the clamp cover surface.

2. The structure for mounting a retrofit part to a cladding member according to claim 1, wherein a bitable member or a frictional force enhancing member enabling gripping by the first plurality of projections is secured to an exterior surface of the cladding member.

3. The structure for mounting a retrofit part to a cladding member according to claim 2, wherein the bitable member or the frictional force enhancing member corresponds to any one of a tube to be laid over the exterior surface, a resin layer to be provided over the exterior surface, and a coating to be provided over the exterior surface.

4. The structure for mounting a retrofit part to a cladding member according to claim 2, wherein the bitable member or the frictional force enhancing member corresponds to a lower tape winding wound around the exterior surface.

5. The structure for mounting a retrofit part to a cladding member according to claim 1, wherein the clamp cover includes a second plurality of projections extending toward the mount surface of the clamp base.

6. The structure for mounting a retrofit part to a cladding member according to claim 1, wherein the clamp cover is hingedly attached to the clamp base, and is configured to open in a direction perpendicular to the insertion direction.

7. The structure for mounting a retrofit part to a cladding member according to claim 1, wherein the clamp cover surface includes a plurality of recesses, and the structure includes a plurality of chips, each of the chips including the second plurality of projections, each of the recesses configured to receive insertion of a respective one of the plurality of chips.

* * * * *